US007352703B2

(12) United States Patent
Elie-Dit-Cosaque et al.

(10) Patent No.: US 7,352,703 B2
(45) Date of Patent: Apr. 1, 2008

(54) PROTECTION SCHEME FOR A COMMUNICATIONS NETWORK UNDER MULTIPLE FAILURES

(75) Inventors: David Elie-Dit-Cosaque, Richardson, TX (US); Maher Ali, Plano, TX (US)

(73) Assignee: Alcatel Lucent, Paris (FR)

( * ) Notice: Subject to any disclaimer, the term of this patent is extended or adjusted under 35 U.S.C. 154(b) by 1016 days.

(21) Appl. No.: 10/426,145

(22) Filed: Apr. 29, 2003

(65) Prior Publication Data

US 2004/0218525 A1 Nov. 4, 2004

(51) Int. Cl.
*G01R 31/08* (2006.01)
(52) U.S. Cl. ...................... 370/237; 379/242
(58) Field of Classification Search ............... 370/216
See application file for complete search history.

(56) References Cited

U.S. PATENT DOCUMENTS

| | | | |
|---|---|---|---|
| 5,093,824 A | | 3/1992 | Coan et al. |
| 5,179,548 A | | 1/1993 | Sandesara |
| 5,889,610 A | | 3/1999 | Fatehi et al. |
| 5,986,783 A | | 11/1999 | Sharma et al. |
| 6,498,778 B1 * | | 12/2002 | Cwilich et al. ............. 370/216 |
| 6,633,544 B1 * | | 10/2003 | Rexford et al. ............. 370/238 |
| 6,850,705 B2 * | | 2/2005 | Su et al. ........................ 398/5 |
| 7,039,009 B2 * | | 5/2006 | Chaudhuri et al. ......... 370/225 |
| 7,095,712 B2 * | | 8/2006 | Kinoshita et al. ........... 370/217 |
| 7,187,652 B2 * | | 3/2007 | Lee et al. .................... 370/238 |
| 2002/0097671 A1 * | | 7/2002 | Doverspike et al. ........ 370/216 |
| 2004/0114512 A1 * | | 6/2004 | Johri .......................... 370/225 |

OTHER PUBLICATIONS

Sengupta et al.; Capacity Efficient Distributed Routing of Mesh-Restored Lightpaths in Optical Networks; IEEE; Nov. 2001; 5 pages.
Elie-Dit-Cosaque et al.; Informed Dynamic Shared Path Protection; Optical Fiber Conference (OFC Mar. 2002), Anaheim, CA; 3 pages.
Lee et al.; Hierarchical Restoration Scheme for Multiple Failures in GMPLS Networks; Proceedings of the International Conference on Processing Workshops, IEEE; 2002; 6 pages.
Wang et al.; Path vs. Subpath vs. Link Restoration for Fault Management in IP-over-WDM Networks: Performance Comparisons Using GMPLS Control Signaling; IEEE Communications Magazine; Nov. 2002; pp. 80-87.
Doyle; Routing TCP/IP, vol. 1, Macmillan Technical Publishing, 1998, pp. 176-181.

(Continued)

*Primary Examiner*—Chau Nguyen
*Assistant Examiner*—Eunsook Choi
(74) *Attorney, Agent, or Firm*—Bobby D. Slaton

(57) ABSTRACT

A system and method for implementing a shared protection scheme under a scenario of multiple failures in an optical network. In one embodiment of the invention, a working path between an ingress node and an egress node is computed responsive to a connection request received in the network. One or more backup paths are computed between the ingress and egress nodes, which are activatable upon a failure condition associated with the working path or the backup paths. The backup paths may be based on link and/or node disjointedness, as well as resource-based cost constraints.

34 Claims, 10 Drawing Sheets

OTHER PUBLICATIONS

Strand et al.; Issues For Ruting In The Optical Layer; IEEE Communications Magazine; Feb. 2001; vol. 39, Issue 2; pp. 81-87.

Su et al.; An online distributed protection algorithm in WDM networks; IEEE; 2001; pp. 1571-1575.

Ali et al.; Network Optimization with Transmission Impairments-Based Routing; 27th European Conference on Optical Communications; 2001; ECOC '01; vol. 2001; pp. 42-43.

Chlamtac et al.; Lightpath Communications: An Approach to High Bandwidth Optical WAN's; IEEE Transactions on Communications; Jul. 1992; vol. 40; Issue 7; pp. 1171-1182.

Doverspike et al.; Challenges for MPLS in Optical Network Restroation; IEEE Communications Magazine; Feb. 2001; vol. 39, Issue 2, pp. 89-96.

Ali et al.; Enhancements to Multi-Protocol Lambda Switching (MP/S) to Accommodate Transmission Impairments; Global Telecommunications Conference; 2001; GLOBECOM '02, vol. 1; IEEE 2001; pp. 70-75.

* cited by examiner

*300A*

| SHARED PROTECTION TABLE | | |
|---|---|---|
| LINK | CHANNEL/(FIBER) | WORKING PATH(S) |
| AB | 1 | {A,B,D,F} |
| AB | 2 | {A,B} |
| AB | 3 | |
| AB | 4 | {A,C,D,F} |
| AB | 5 | {A,C,E} {B,D,F} |
| AB | 6 | {Q,R,S} |
| ⋮ | ⋮ | ⋮ |
| AC | 1 | {A,C} |
| AC | 2 | {A,B,D,F} |
| ⋮ | ⋮ | ⋮ |

| LINK ALLOCATION TABLE | | |
|---|---|---|
| LINK | CHANNEL/(FIBER) | STATUS |
| AB | 1 | IN USE |
| AB | 2 | IN USE |
| AB | 3 | AVAILABLE |
| AB | 4 | SHARED |
| ⋮ | ⋮ | ⋮ |
| AC | 1 | AVAILABLE |
| AC | 2 | SHARED |
| ⋮ | ⋮ | ⋮ |

FIG. 3B

PROTECTION SCHEME FOR A COMMUNICATIONS NETWORK UNDER MULTIPLE FAILURES

CROSS-REFERENCE TO RELATED APPLICATION(S)

This nonprovisional application discloses subject matter related to the subject matter disclosed in the following commonly owned co-pending patent application(s): (i) "Informed Dynamic Path Protection for Optical Networks," application Ser. No. 09/998,362, filed Nov. 29, 2001, in the name(s) of David Elie-Dit-Cosaque and Maher Ali, which is (are) hereby incorporated reference for all purposes.

BACKGROUND OF THE INVENTION

1. Technical Field of the Invention

The present invention generally relates to telecommunications and data communications networks. More particularly, and not by way of any limitation, the present invention is directed to a protection scheme for such networks under multiple failures.

2. Description of Related Art

A network operator typically takes into consideration multiple objectives when routing traffic through a network. One objective may be to minimize cost. Another objective may be to minimize transmission impairments. A third objective may be to maximize the possibility that the network can be restored using a backup path in the event of a failure thereof.

Generally, there are three types of restoration schemes: dedicated restoration, shared restoration, and best effort restoration. In dedicated restoration, the capacity of a protection, or restoration, path is reserved for an individual demand. In shared restoration, the restoration capacity is reserved, but shared across multiple demands. In best effort restoration, no reservation is made and restoration capacity is allocated in real time on an as-available basis. The first two classes of restoration both have guaranteed restoration in the event of a single failure; however, they differ in restoration time, as shared restoration requires real-time path setup.

Whereas intelligent mesh routing techniques have been available for computing a backup path in a 1:N or M:N shared restoration scheme, such techniques tend to be inadequate where multiple failures are encountered in a network. Further, known protection path implementations do not address the issue of correlated multiple failures, especially in the context of applicable network resource constraints.

SUMMARY OF THE INVENTION

Accordingly, the present invention advantageously provides a system and method for implementing a shared protection scheme under a scenario of multiple failures in a network. In one aspect, the present invention is directed to a method for providing protection in a communications network including a plurality of nodes coupled by communication links. The method commences by computing a working path between an ingress node and an egress node responsive to a connection request received in the network. One or more backup paths are computed between the ingress and egress nodes, which are activatable upon a failure condition associated with the working path or the backup paths. The backup paths may be based on link and/or node disjointedness, as well as resource-based cost constraints in an exemplary implementation. Setup messages regarding the working path and the backup paths are then transmitted to the nodes spanning the paths. In one exemplary embodiment, the backup paths are computed using a methodology wherein the links between two backup paths or between a backup path and the working path are completely disjointed. In another exemplary embodiment, the backup and working paths may be partially disjoint in term of the links. In a further exemplary embodiment, both links as well as nodes may be completely or partially disjoint between the working path and backup paths. As a further variation, the backup path implementation may be activated based on network quality, wherein nodal and/or link quality degradation may be monitored for determining a failure condition arising out of temporal or spatial correlation of degradation events.

In another aspect, the present invention is directed to a system for providing protection in a communications network including a plurality of nodes coupled by communication links. A structure is provided for computing a working path between a ingress node and an egress node responsive to a connection request received by the ingress node. Another structure is included for computing one or more backup paths between the ingress and egress nodes, wherein each of the backup paths is activatable upon a failure condition associated with at least one of the working path and the backup paths. A control structure is responsible for transmitting messages to nodes in the network for setting up the working path and backup paths. By way of implementation, these structures may be embodied in software, hardware, or any combination thereof, and may be associated with a network node or distributed in the network.

BRIEF DESCRIPTION OF THE DRAWINGS

A more complete understanding of the present invention may be had by reference to the following Detailed Description when taken in conjunction with the accompanying drawings wherein:

FIGS. 3A and 3B depict exemplary database portions for effectuating multiple backup paths in accordance with one embodiment of the present invention;

DETAILED DESCRIPTION OF THE DRAWINGS

Figure 1:
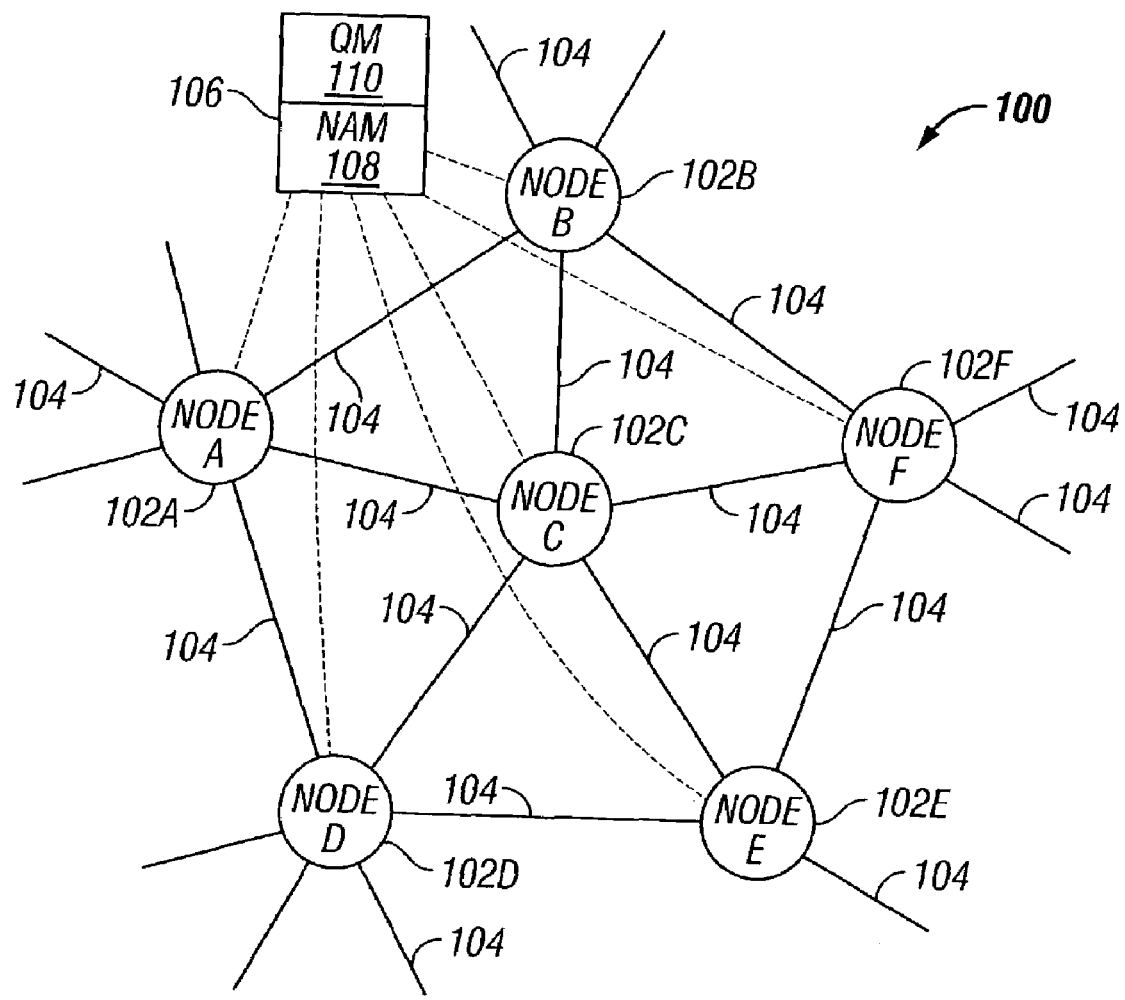
FIG. 1 depicts an exemplary optical transport network wherein a protection scheme involving multiple backup paths may be implemented in accordance with the teachings of the present invention.

In the drawings, like or similar elements are designated with identical reference numerals throughout the several views thereof, and the various elements depicted are not necessarily drawn to scale. Referring now in particular to FIG. 1, depicted therein is an exemplary optical transport network 100 wherein a protection scheme involving multiple backup paths may be implemented in accordance with the teachings of the present invention. The optical transport network 100, which may be implemented as a generalized multi-protocol label switched (GMPLS) optical transport network, includes a plurality of nodes or network elements 102A through 102F coupled by optical links 104. An optical link 104 is effectuated as a fiber carrying information between two nodes; for example, between Node A 102A and Node D 102D. The optical fiber is operable to carry information over a number of wavelengths or "channels", effectuated by means of such well-known techniques as wavelength division multiplexing (WDM) or dense WDM (DWDM), wherein different channels of information are modulated using respective frequencies or wavelengths. The number of wavelengths, N, is dependent on implementation and may be different for each fiber.

As the optical links 104 are unidirectional, typically a pair of links are disposed between any two adjacent nodes in order to facilitate bidirectional transport therebetween, each node receiving information on one link and transmitting information on the other link. It will be apparent that for purposes of illustration only one link is shown in FIG. 1, it being understood that at least one link in each direction would normally be used in an actual implementation. When information is received by an edge node (i.e., an ingress node) of the transport network 100, a path is computed between the ingress node and the destination node from which the information is to exit the transport network (i.e., the egress node). Thus, a path may be treated as a sequential concatenation of a number of links spanning between the ingress and egress nodes. By way of convention, a path may be designated as string of nodes disposed between the originating and destination nodes. For instance, the ordered sequence {A,D,C,F} designates a path between Node A as the ingress node and Node F as the egress node, Nodes D and C being intermediary nodes.

A "connection" is a data transmission event over a path and is determined by a start time and a duration time. The connection may use different channels over different links. For example, a connection between Node A 102A and Node E 102E may use path {A,D,E} wherein the information is passed from Node A to Node D over one wavelength ($\lambda_i$) and is passed from Node D to Node E over another wavelength ($\lambda_j$).

Several techniques are available for computing end-to-end (ETE) paths in the optical transport network 100 based on a variety of criteria, e.g., hop count, link costs, et cetera. A network administrator and manager (NAM) 108 may be disposed centrally or distributed over one or more nodes of the transport network 100. A quality monitor (QM) 110 provided with the NAM functionality 108 is operable to monitor the various network components, e.g., nodes and links, and apply suitable criteria to determine if a node or link will experience degradation (i.e., a failure). In one implementation, the NAM/QM functionality may be co-located as an administrative node 106 on the network operable to monitor the various network components, i.e., nodes and links, and take appropriate actions with respect to path selection, switching, and restoration. As will be seen in detail hereinbelow, the NAM/QM integrated functionality is also capable of ascertaining spatial and temporal correlations among multiple failures that may afflict the network and accordingly effectuate one or more protective backup paths using the methodologies of the present invention.

Figure 2:
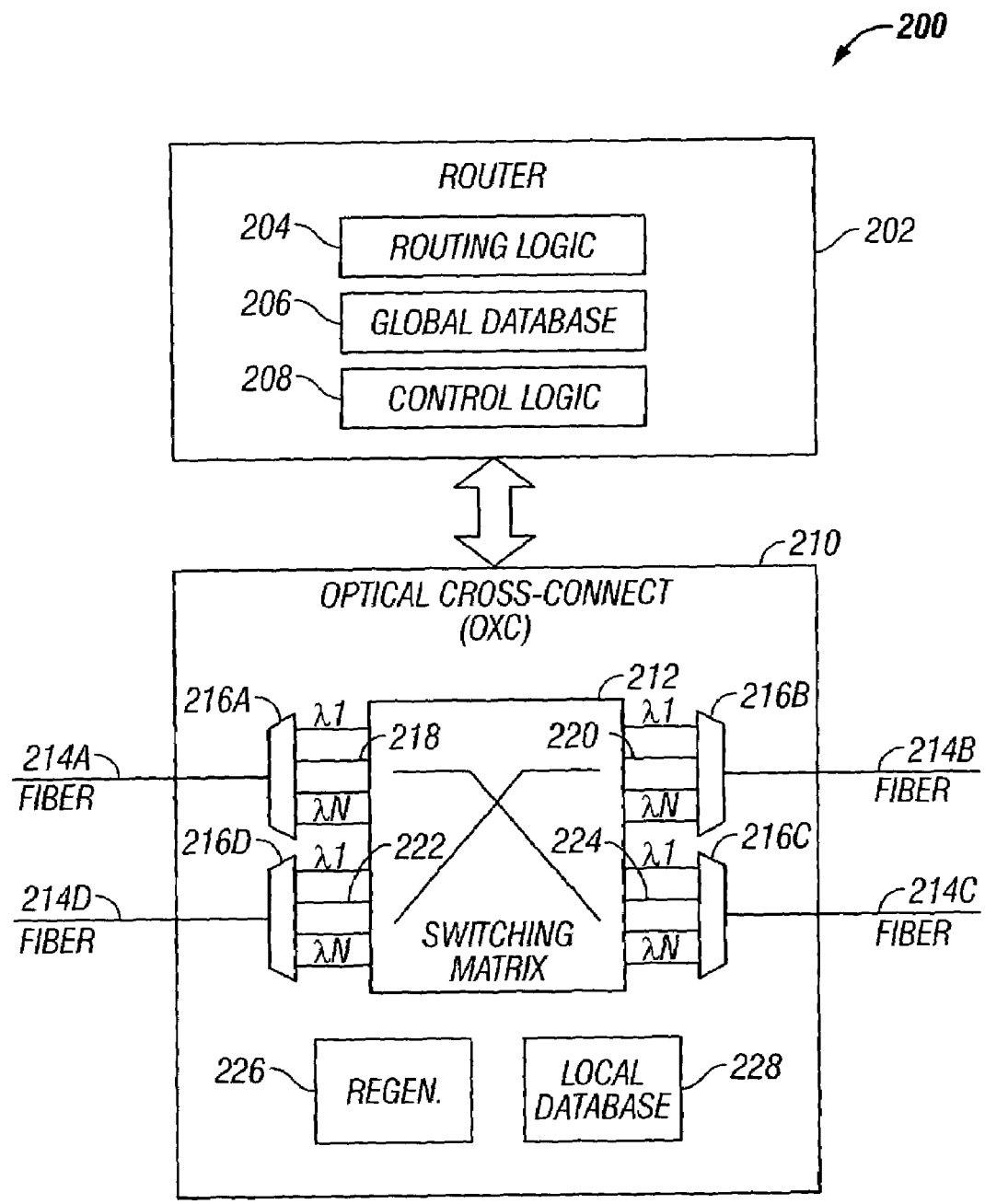
FIG. 2 depicts an embodiment of an exemplary optical network node.

FIG. 2 depicts a block diagram of an embodiment of an exemplary optical network node 200. A routing part 202 including routing protocol logic 204, a global data base 206 and control logic 208, is coupled to an optical cross-connect (OXC) module 210 which includes a switching matrix 212 disposed between one or more input demultiplexers (DE-MUXes) and one or more output DEMUXes. In general operation, router 202 is responsible for control signaling in the network in which the node 200 is disposed, e.g., the optical transport network 100 shown in FIG. 1, using appropriate routing logic 204. The global database 206 comprises one or more tables that provide a current topology of the network 100 for intelligent, dynamic creation of network paths under control of control logic 208. Preferably, in one implementation, the global database 206 provides information regarding each channel of each link in the entire network domain. Status of each channel can be one of the following: (i) channel is used in a working path; (ii) channel is used in a protection or backup path, but not available for sharing; (iii) channel is used in a backup path and is available for sharing; and (iv) channel is not used for either working or protection paths. Further, where the NAM/QM functionality is distributed over network nodes, the global database may also include quality information relating to the network components. distributed over network nodes, the global database may also include quality information relating to the network components.

The OXC module 210 is responsible for passing information from a channel on an incoming fiber to a channel on an outgoing fiber using the switching matrix 212. By way of example, two incoming fibers 214A and 214D and two outgoing fibers 214B and 214C are shown. Reference numerals 216A and 216D refer to a pair of DEMUXes operable to separate the incoming channels 218 and 222 ($\lambda_1$ through $\lambda_N$) associated with the incoming fiber 214A and 214D, respectively, before being passed to the switching matrix 212. The switching matric 212 passes each incoming channel to an outgoing channel 220 as may be defined by a local database 228. A pair of MUXes 216B and 214C operate to multiplex the outgoing channels 220 and 224 for transmission onto fibers 214B and 214C respectively. Whereas the same number of wavelengths (i.e., optical channels $\lambda_1$ through $\lambda_N$) are shown for both incoming and outgoing links, different implementations are possible. Further, a regenerator module 226 may be used for coupling channels with different wavelengths.

Continuing to refer to FIG. 2, global database 206 includes information for determining the existence of links having channels currently used for protection paths, where the channels can be shared with other protection paths, and links having channels that are currently unused by either working paths or protection paths. Whereas it should be apparent that the global database 206 may be implemented in a variety of forms, FIGS. 3A and 3B depict two exemplary database portions for effectuating multiple backup paths in accordance with one embodiment of the present invention. As shown in FIG. 3A, a global shared protection table 300A contains entries for each channel in each link that is used for path protection. In the illustrated embodiment, each channel is identified by the link and channel number fields. If there are multiple fibers between two nodes, each channel could be identified by link, fiber, and channel number within the fiber. The working path(s) associated with the channel are identified in the appropriate Working Path field which is set forth as a {NODES} field that lists all nodes on that Working Path.

A global link allocation table 300B is shown in FIG. 3B, which maintains a record of the status of all channels for all links in the network domain. Again, each channel on each of the links is identified by link and channel number (and, optionally, fiber number) fields. A Status field identifies the channel as being "Shared", "In Use" or "Available". "Shared" status is employed when a channel is currently used in a path, e.g., for a protection path, that could be used for shared protection. "In Use" identifies channels used for working paths. Further, "In Use" status may also be applied for protection paths for which shared protection is not to be used. By way of illustration, for a high quality class of service, a working path may not be used using 1+1 protection, where sharing of the protect channels is not allowed. Finally, "Available" identifies channels that not currently used for protection or working paths.

In operation, every exemplary network node 200 maintains the entries in the global allocation database for its own links. Information regarding other links in the global allocation database may be compiled from allocation information provided by other nodes in the network domain. In one implementation, such information may be shared among all nodes in the network using a variant of the Open Shortest Path First (OSPF) protocol upgraded for optical networks. Further, protection messages for updating the nodal global allocation database may be transmitted using the Label Distribution Protocol (LDP) messages. By way of example, the protection messages may be the same as those used for reservation of a working path, with the addition of two fields: (1) a Type field that indicates whether the connection is for a protection path or a working path; and (2) a Working Path field that identifies whether the working path needs a backup protection path.

Figure 4:
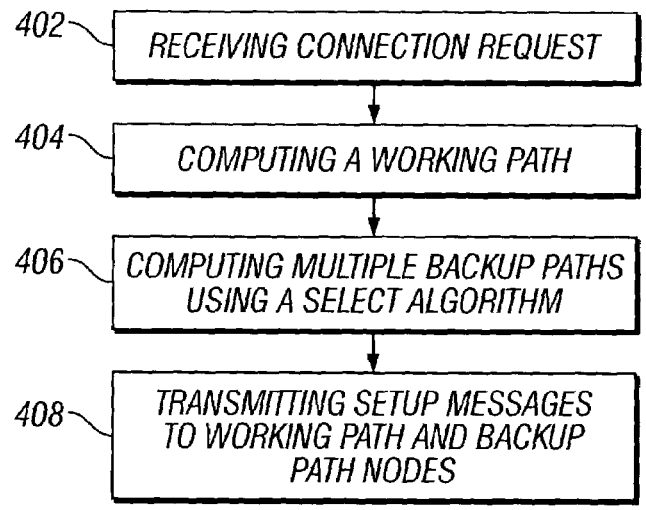
FIG. 4 is a flow chart of an embodiment of a method of the present invention for implementing a protection scheme capable of withstanding multiple failures.

In a presently preferred exemplary embodiment of the present invention, the protection path selection is performed at the source node (i.e., ingress node), as is the working path selection. FIG. 4 is a flow chart of an embodiment of a method of the present invention for implementing a protection scheme capable of withstanding multiple failures. When a connection request is received at an ingress node (step 402) which has a computer readable medium having instructions therein which when executed by a computer cause the ingress node to compute a working path based on the network topology acquired from the co-located global database or from a centralized administrative node (step 404). The working path may be calculated using a number of various well-known techniques. An exemplary embodiment is provided in the following co-pending commonly-owned U.S. patent application entitled "Informed Dynamic Path Protection For Optical Networks," filed Nov. 29, 2001, application Ser. No. 09/998,362, cross-referenced hereinabove and incorporated by herein. Thereafter, one or more backup paths are computed using one of several methodologies set forth in detail below for purposes of providing protection against multiple failures (step 406). As will be seen, these methodologies vary depending upon link disjointedness, node disjointedness, and cost factors associated with spatial/temporal correlations among failures. Once the working path and multiple backup path computations are completed, appropriate setup and/or activation messages may be transmitted from the source node to the path nodes of the network (step 408). Again, additional details concerning message transmission and wavelength assignment process may be found in the cross-referenced U.S. patent application identified above.

Figure 5A:
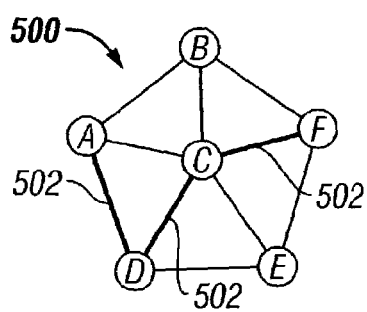
FIGS. 5A-5E illustrate different topological stages of an exemplary network wherein multiple backup paths may be computed in accordance with the teachings of the present invention.
Figure 5B:
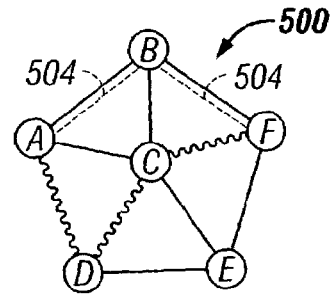
Figure 5C:
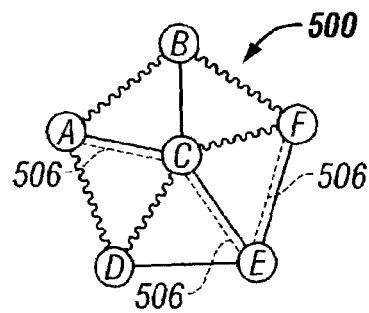
Figure 5D:
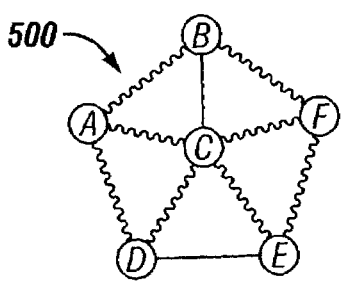

FIGS. 5A-5E illustrate different topological stages of an exemplary network 500 wherein multiple backup paths may be computed in accordance with the teachings of the present invention depending on link disjointedness and/or node disjointedness. Network 500 comprises five nodes, A through F, wherein an exemplary working path from Node A to Node F is identified as Path {A,D,C,F}, denoted by reference numeral 502. In a complete link disjoint scheme, successive path computations involve network topologies wherein the links that make up previously computed paths are logically removed from the topology. On the other hand, in partial link disjoint scheme, there may be some link commonality between a new path and a previously computed path, the degree of commonality depending upon certain cost/penalty constraints associated with sharing or non-sharing of protection links. FIGS. 5B through 5D depict three topologies that obtain with respect to the exemplary network 500 when a complete link disjoint scheme is used for calculating multiple backup paths. In these FIGURES, previously computed paths are illustrated as having links with wavy lines, which are logically removed from the network topology for calculating subsequent paths. After removing the exemplary working path 502 from the network topology (i.e., links AD, DC and CF are shown in wavy lines), a first protection path is computed using any known algorithm. For purposes of illustration, a protection path 504 is shown in a dashed line between the source node (Node A) and the destination node (Node F), using links AB and BF. Thereafter, if the requested connection session between nodes A and F warranted more than one backup, another iteration of a protection path computation takes place. As shown in FIG. 5C, links AB and BF are also removed from the network topology for this calculation (i.e., AB and BF links are shown in wavy lines). A second protection path between Node A and Node F is computed, again using any known or heretofore unknown algorithm, after removing all previously calculated links from the topological graph. Reference numeral 506 refers to the exemplary second protection path comprising links AC and CF. Upon removal of these newly calculated links, the network graph results in a topology that will not permit any further paths between the source and destination nodes (FIG. 5D).

Figure 5E:
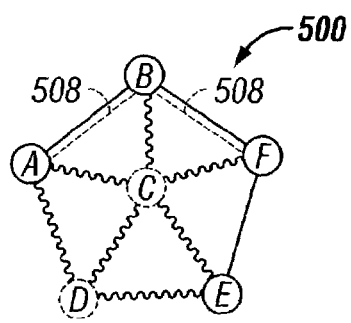

FIG. 5E depicts the exemplary network topology in a complete node disjoint scenario. As can be readily appreciated, the network topology graph shrinks even more rapidly in this scenario due to the fact that when a previously used node (either in a working path or in a backup path) is logically removed from the graph, all links associated with that node are also removed. Clearly, the end nodes, i.e., the source and destination nodes, are not deleted from the subsequent path calculations. Accordingly, upon removal of the intermediary nodes C and D (as illustrated by the dashed circles around them) from the graph, all links associated therewith are also removed, leaving only nodes A, B, E and F. Again, a protection path may be calculated within the resulting graph using any technique, e.g., Dijkstra's Shortest Path First (SPF) algorithm. Reference numeral 508 refers to an exemplary backup path involving links AB and BF, as illustrated by the dashed line segments.

It should be appreciated that a diverse set of backup paths can provide better protection against multiple failure events in the network. For instance, in the example of a working path being protected by two backup paths, the probability of failure is intuitively low, as even after the failure of the working path and one of the protection paths it is still possible to restore the connection between the end nodes. A single backup path may also provide protection against multiple failures as long as the failures do not affect the working and protection paths simultaneously. Accordingly, having multiple backup paths advantageously decreases the probability of simultaneous interruption of all backups. Moreover, the overall benefits of multiple backup paths are clearly related to spatial and temporal distributions of the failures as well as the selected methodology for computing backup paths.

Figure 6:
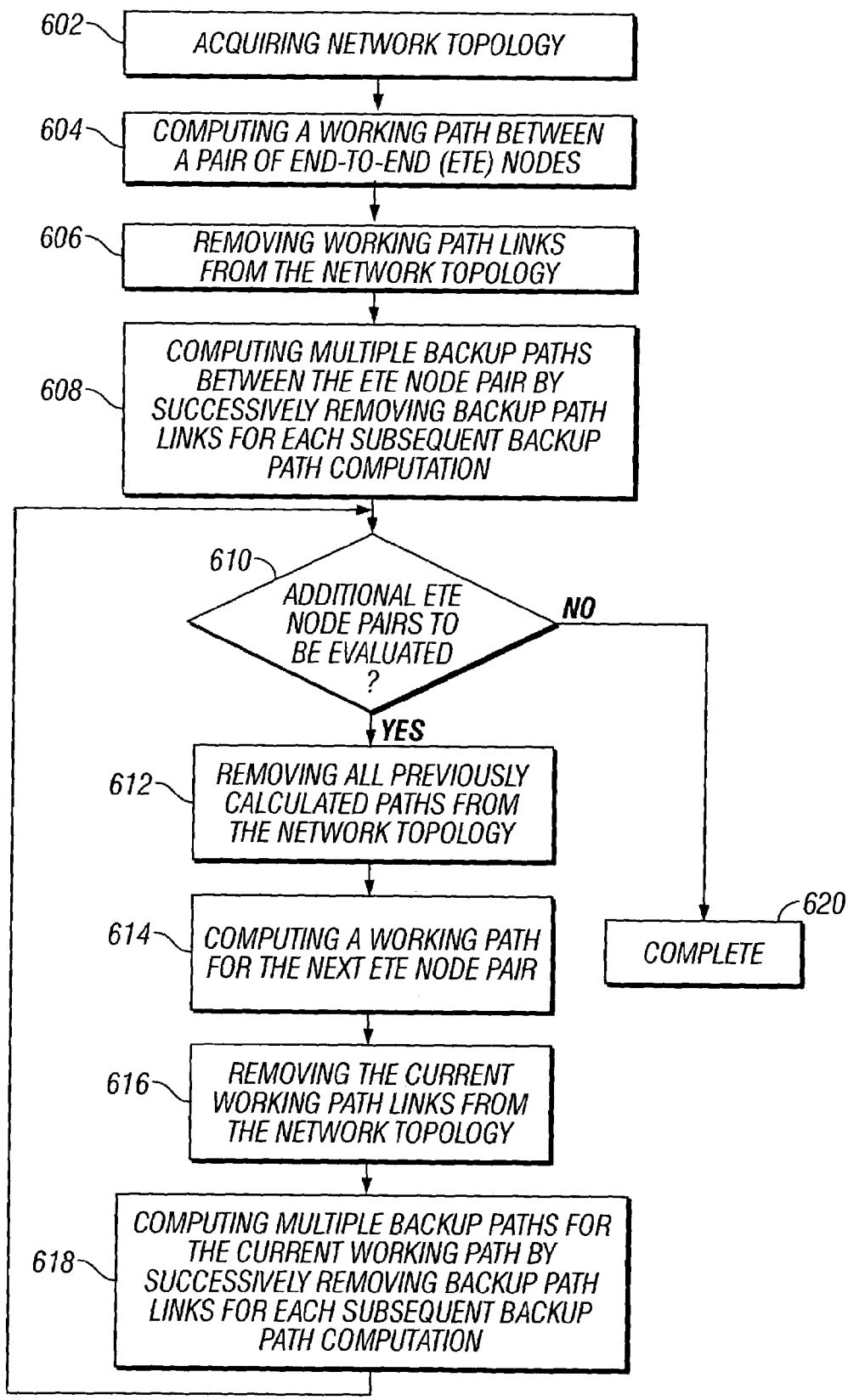
FIG. 6 is a flow chart of an embodiment of a method of the present invention for computing multiple backup paths where the links are completely disjoint.

FIG. 6 is a flow chart of an embodiment of a method of the present invention for computing multiple backup paths where the links are completely disjoint. First, a network topology is acquired (step 602), wherein all links in the network topology may be attributed the same cost. Thereafter, a working path is computed pursuant to a connection request between a pair of end-to-end (ETE) nodes, i.e., the source and destination nodes (step 604). As noted in the foregoing discussion, any known or heretofore unknown routing technique may be employed that optimizes a suitable metric (e.g., hop count, path distance, et cetera). Working path links are then logically removed from the network topology (step 606) so as to ensure that they are not reused for subsequent paths. One or more backup paths between the ETE nodes may then be calculated in a similar fashion until the requisite number of paths are computed or the resultant topology does not sustain any more backups (step 608).

If no additional ETE pairs are to be evaluated as well (decision block 610), the process flow then stops (step 620). Otherwise, operations similar to those described above are carried out (steps 612, 614, 616 and 618) to compute multiple backup paths that are completely link disjoint. The process flow may continue until no more ETE pairs are left.

Figure 7:
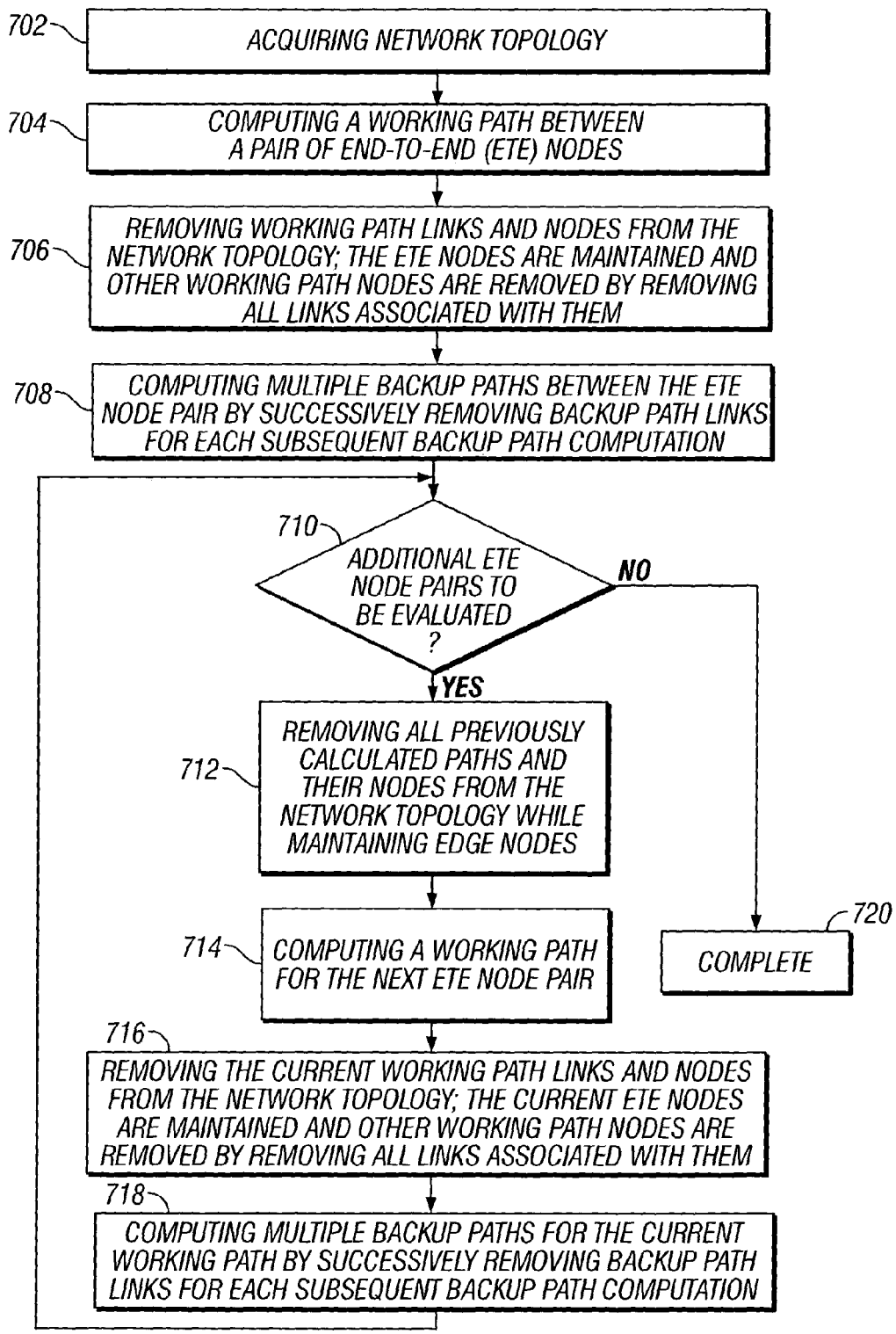
FIG. 7 is a flow chart of an embodiment of a method of the present invention for computing multiple backup paths where the links and nodes are completely disjoint.

In another embodiment, path computations may be predicated upon treating both links as well as nodes as completely disjoint. FIG. 7 is a flow chart of an embodiment of a method of the present invention for computing multiple backup paths where the links and nodes are completely disjoint. Similar to the process set forth above, a network topology is acquired first by an ingress node of an ETE pair (step 702). Again, all links in the network topology may be attributed the same cost using an appropriate metric. A working path is computed thereafter pursuant to a connection request between the ingress and egress nodes of the ETE pair (step 704).

Both working path links and working path nodes are then logically removed from the network topology (step 706) so as to ensure that they are not reused for subsequent paths. As explained before, a path node is removed by removing all the links connected to it. Clearly, the source and destination nodes are not removed from these computations. Subsequently, one or more backup paths between the ETE nodes may then be calculated in a similar fashion until the requisite number of paths are computed or the resultant topology does not sustain any more backups (step 708).

If no additional ETE pairs are to be evaluated as well (decision block 710), the process flow then stops (step 720). Otherwise, operations similar to those described above are carried out (steps 712, 714, 716 and 718) to compute multiple backup paths that are completely link-disjoint as well as node-disjoint. The process flow may continue until no more ETE pairs are left.

Figure 8:
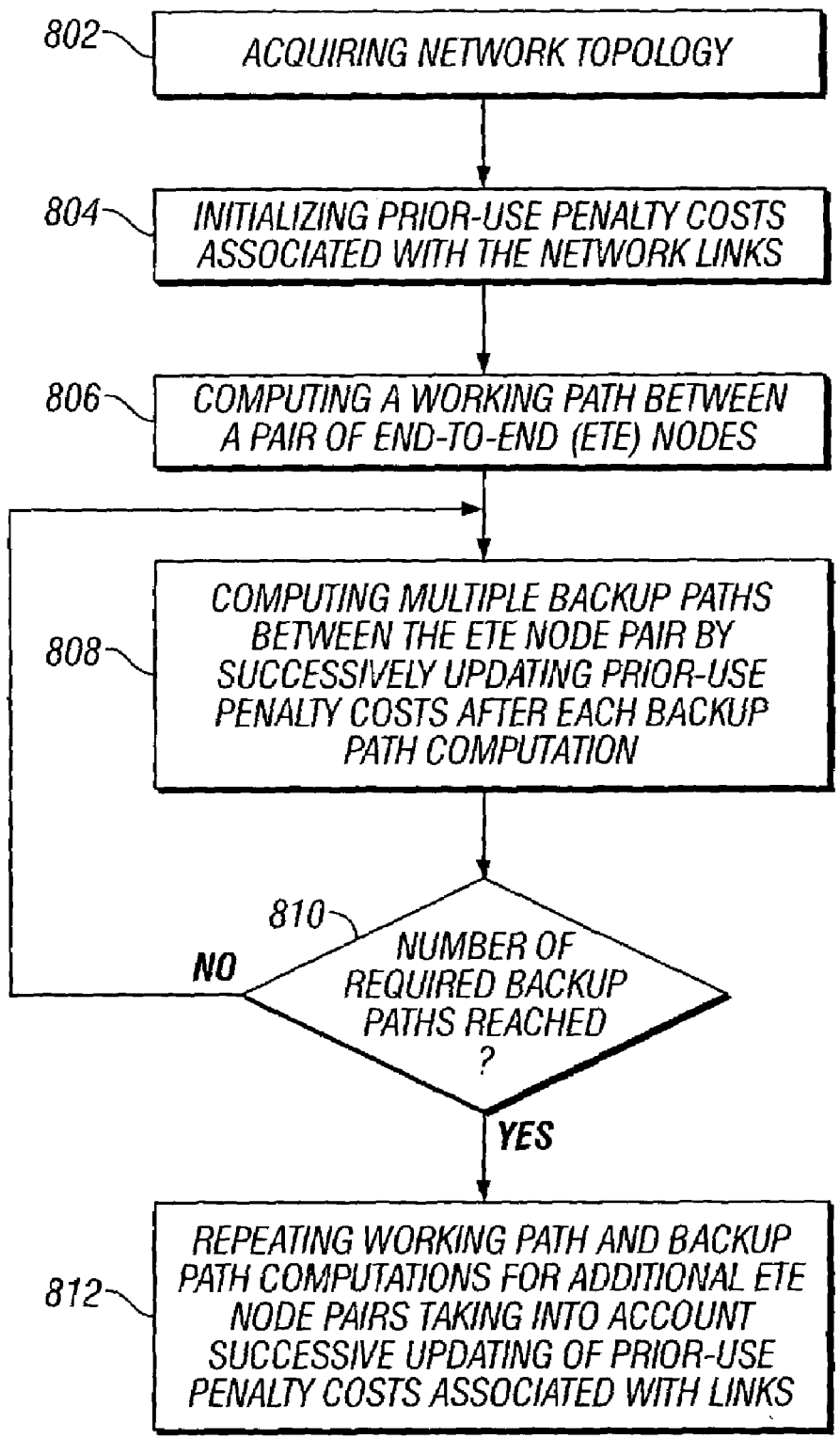
FIG. 8 is a flow chart of an embodiment of a method of the present invention for computing multiple backup paths where the links are partially disjoint.

Because of resource constraints and connectivity blocking in a network, it may not be feasible to treat the links, nodes, or both, in a completely disjointed fashion for calculating the backup paths. A variable cost factor may be employed to penalize the links and/or nodes already used for a connection. FIG. 8 is a flow chart of an embodiment of a method of the present invention for computing multiple backup paths where the links are partially disjoint. Upon obtaining the network topology (step 802), prior-use penalty costs ($C_1$) associated with the network links may be initialized (step 804). A working path is then computed for the ingress and egress node pair associated with the connection request (step 806). Subsequent multiple backup paths are computed thereafter by successively updating the link penalty costs after each backup path calculation (step 808). As a result, the methodology attempts to avoid the links that have already been used in a working path connection or a backup connection. The backup paths, therefore, are the destination paths calculated with the new metric that is cost-aware for each iterative step. These steps may be repeated until the number of backup paths requested is reached or when the network topology no longer sustains any additional backup paths between the ETE node pair (decision block 810). If additional ETE node pairs are available that require path computations, the working path and backup paths may be computed by utilizing the process flow set forth above, wherein link penalty costs are properly taken into account for each pair and each path computation (step 812).

Figure 9:
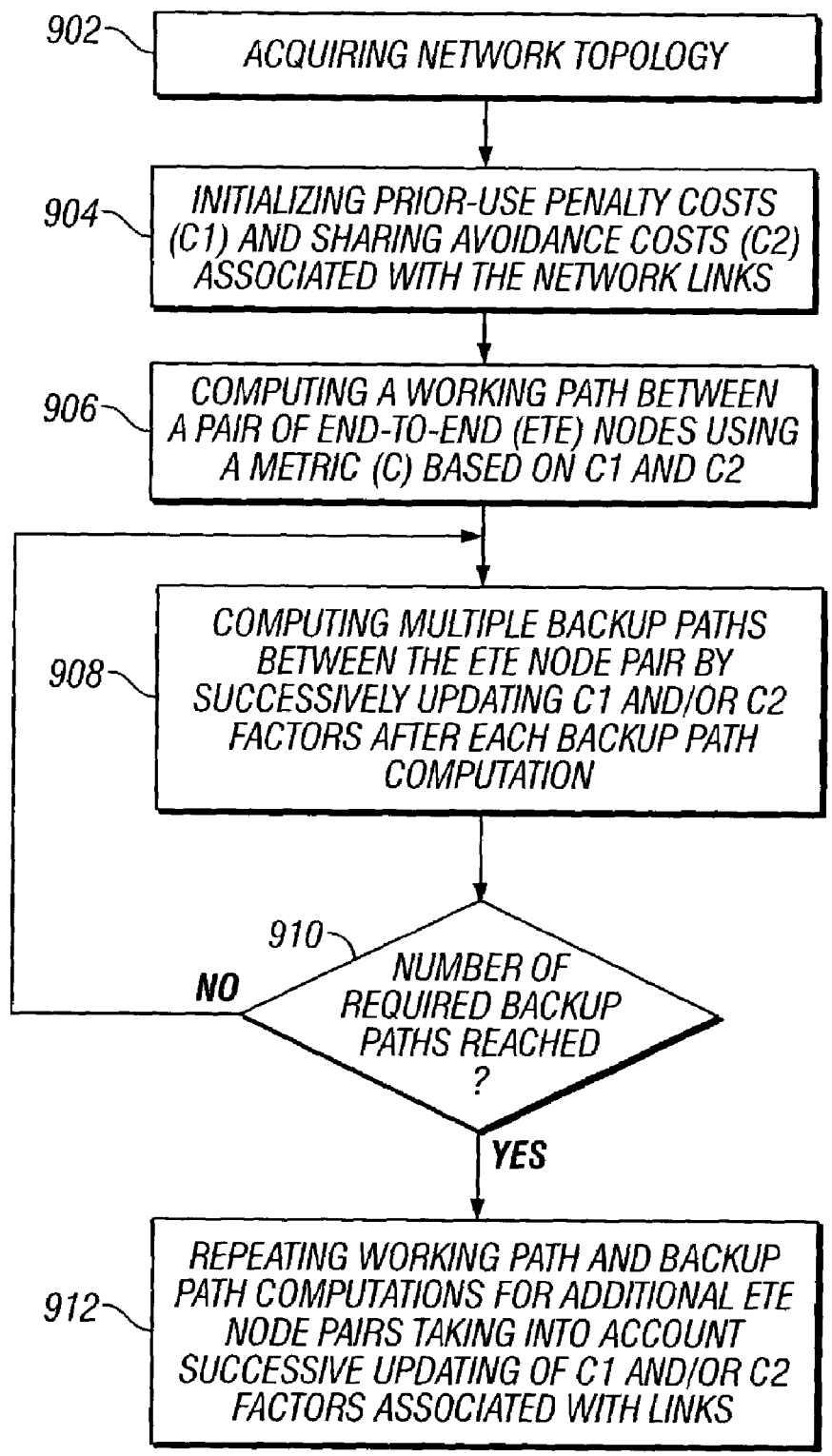
FIG. 9 is a flow chart of an embodiment of a method of the present invention for computing multiple backup paths where the links and nodes are partially disjoint.

As a further variation, both links as well as nodes may be treated as partially disjoint. Again, it should be noted that whereas the partial-disjoint approach may provide a more dynamic and diverse protection scheme for a given topology (although the working and backup paths may not be disjoint end-to-end), network resources may be constrained enough that at least certain level of optimization is necessary with respect to the shared resources. In order to optimize resource sharing, another cost parameter (avoidance cost, $C_2$) can be introduced that quantifies the penalties associated with not sharing a link or node in the network. FIG. 9 is a flow chart of an embodiment of a method of the present invention for computing multiple backup paths where the links and/or nodes are partially disjoint and avoidance costs are also included. Similar to the methodology set forth above, prior-use penalty costs ($C_1$) as well as sharing avoidance costs ($C_2$) associated with the network resources are initialized (step 904) upon acquiring the network's topology (step 902) pursuant to a connection request. A working path is then computed for the ingress and egress node pair associated with the connection request (step 906). A new metric (C) based on a mathematical relationship between $C_1$ and $C_2$ (e.g., $C=C_1*C_2$) may be used for optimizing path computations. Thereafter, subsequent multiple backup paths are computed by successively updating one or both costs after each backup path calculation (step 908). As a result, the methodology not only attempts to avoid, to a partial degree, the links and nodes that have already been used in a working path or a backup path, but also involves computing of paths after taking into consideration various costs that penalize avoidance of resource sharing. These steps may be repeated until a predetermined number of backup paths is reached or when the network topology no longer sustains any additional backup paths between the ETE node pair (decision block 910). If additional ETE node pairs are available that require path computations, the working path and backup paths may be computed by utilizing the process flow set forth above, wherein link/node prior use penalty costs and resource-sharing avoidance costs are properly taken into account for each pair and each path computation (step 912).

Figure 10:
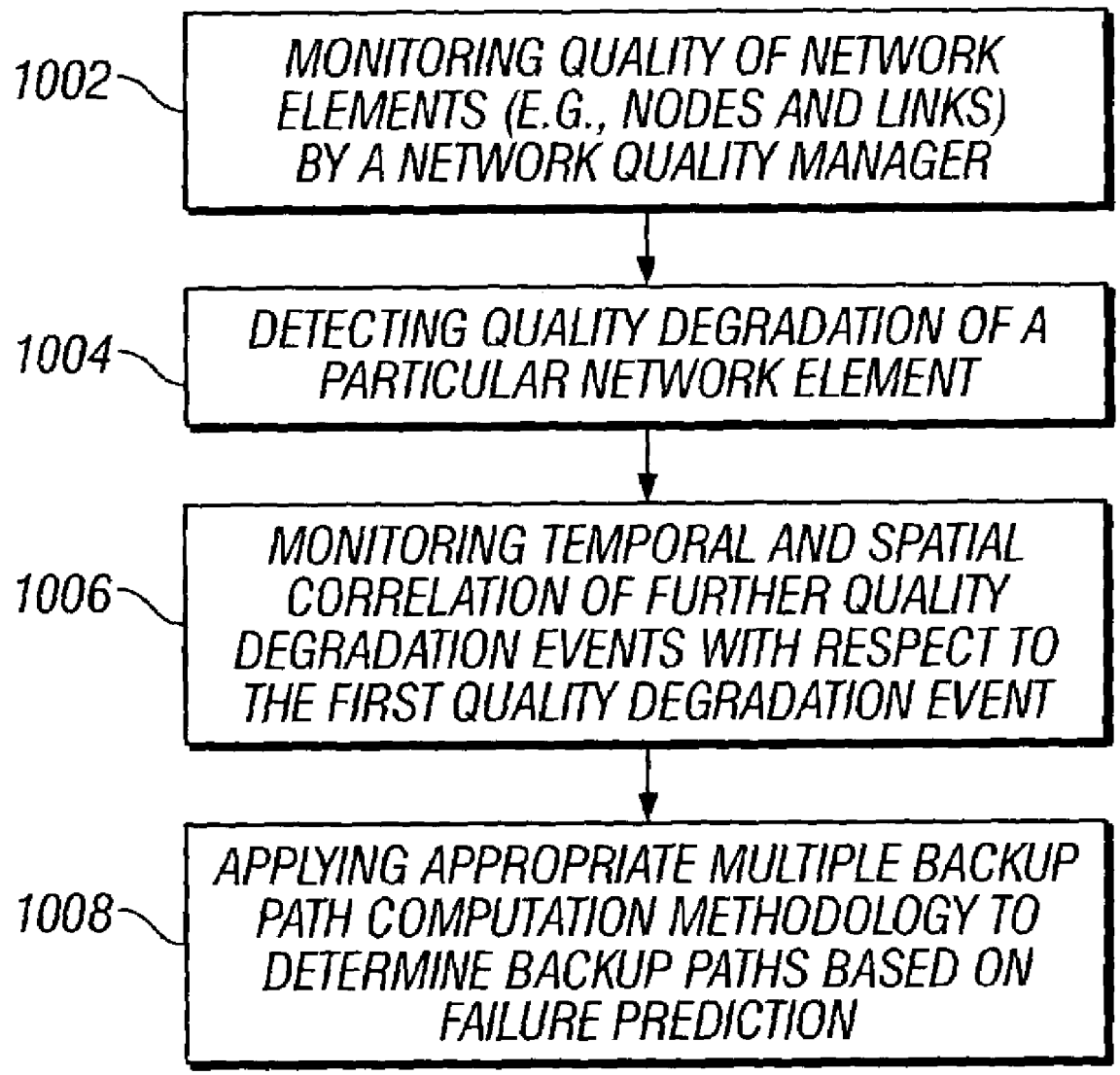
FIG. 10 is a flow chart of an embodiment of a method of the present invention for implementing a multiple backup path scheme based on network quality.

As a further improvement, the multiple backup path computation schemes set forth above may be provided with the capability so as to be dynamically invoked based on network quality, which in turn may depend upon spatial and/or temporal correlation(s) of failures, e.g., a link or nodal degradation event. For instance, a centralized or distributed entity (e.g., QM 110 associated with administrator node 106 shown in FIG. 1) may continuously or periodically or otherwise monitor the quality of network components and upon occurrence of a particular condition, a suitable multiple backup path technique may be activated to compute one or more backup paths. Referring now to FIG. 10, shown therein is a flow chart of an embodiment of a method of the present invention for implementing a multiple backup path scheme based on temporal and spatial correlation of degradation events that gives rise to a failure condition. As alluded to previously, a network quality manager is operable to monitor the quality of network components, e.g., nodes, links, et cetera (step 1002). Each component may be given a quality rating. For instance, a link could be given a rating with respect to an appropriate quality variable that is parameterized between 1 and 10. If the signal quality through that link is degraded or otherwise affected, or if the quality parameter is below a certain threshold, that condition exemplifies a "degradation event" in the network. After detecting the first occurrence of such an event (step 1004), temporal and/or spatial correlation of further quality degradation events is monitored with respect to the first event (step 1006). In one embodiment, a timer may be started with a duration in the order of a minute and all the subsequent degradations occurring on other links during the same time window may be used for defining a Shared Risk Link Group (SRLG). In other words, links that exhibit simultaneous degradation are more likely to fail at about the same time; which can help in early detection of multiple failures. To reduce the possibility of multiple failures, however, two links belonging to the same SRLG are not used for the same lightpath connection (i.e., spatial diversification). Once a degradation correlation profile is determined, an appropriate multiple backup path computation scheme (e.g., the complete link disjoint methodology) may be used to compute a predetermined number of backup paths based on failure prediction.

Figure 11A:
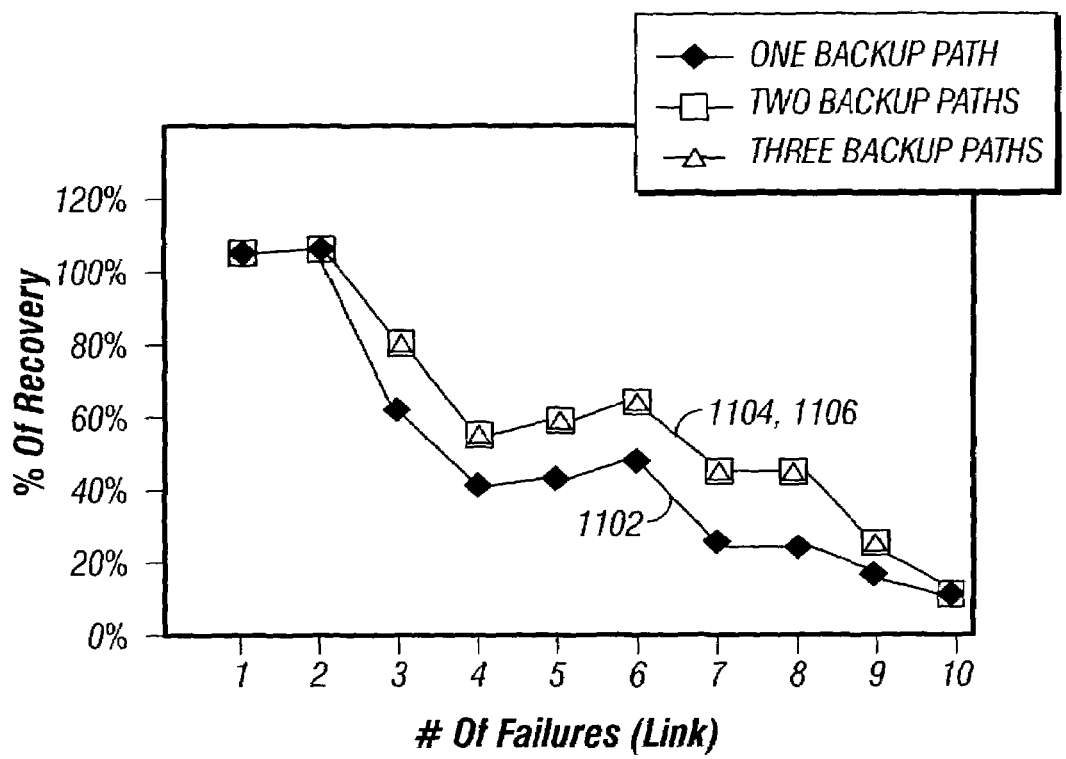
FIGS. 11A and 11B depict two graphs that exemplify simulation results relating to the teachings of the present invention.
Figure 11B:
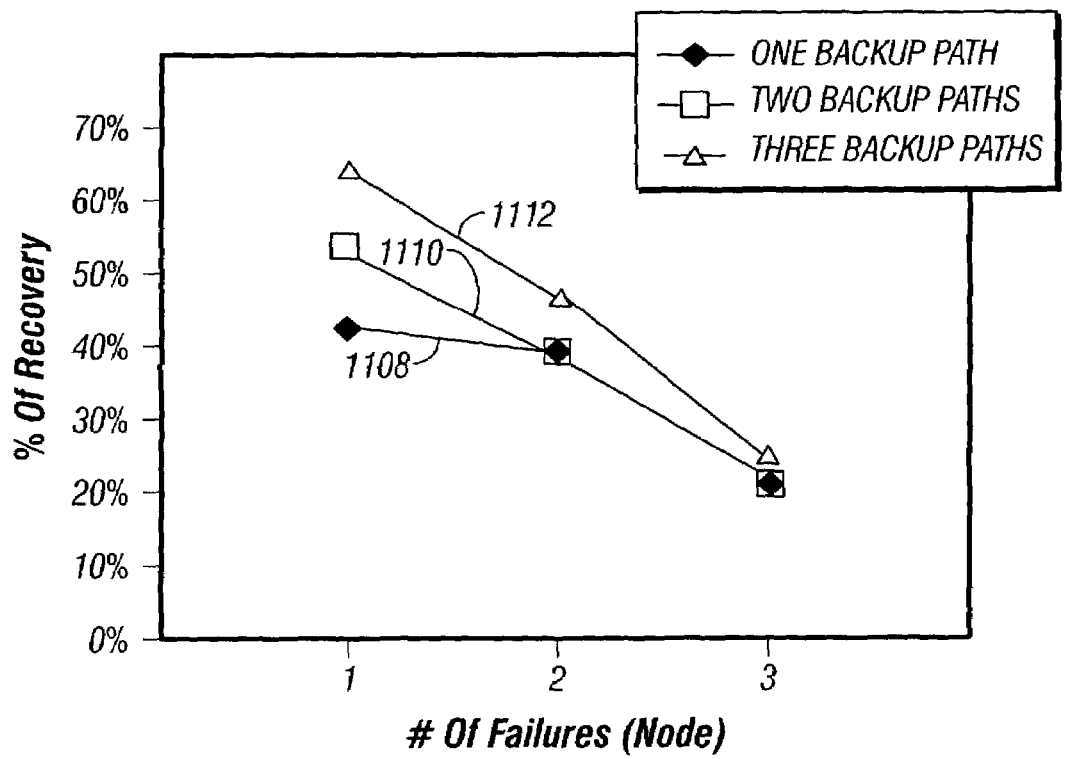

FIGS. 11A and 11B depict two graphs that exemplify simulation results relating to the partial link disjoint scheme provided in accordance with teachings of the present invention. In particular, FIG. 11A shows the recovery performance afforded by multiple backup paths in the context of link failures. Reference numeral 1102 refers to the percentage recovery of an exemplary network under a single partial link disjoint backup path as a function of the number of failures. Likewise, reference numerals 1104 and 1106 refer to the recovery percentages of the network under two and three backup paths, respectively. As can be seen, with up to two failures, there is no substantial improvement seen among the three different backup path regimes. However, when the number of failures increases, the two- and three-backup path regimes provide up to 21% improvement in the recovery performance of the exemplary network. Additionally, as the number of failures reaches 10, all three regimes yield poor results, each with less than 20% recovery.

FIG. 11B depicts the recovery performance of three partial link disjoint backup regimes in the context of nodal failures. For a single node failure, the partial link disjoint scheme achieves about 60% recovery with three backup paths, as exemplified by curve 1112. This is about a 20% improvement over the performance afforded by a single backup path regime (curve 1108). Under a two-backup path regime, the recovery performance is about 50% for a single nodal failure (curve 1110). As with the link failures, when the number of nodal failures increases, the recovery performance of the three variants of the backup path scheme becomes degraded in a substantially similar fashion.

Based upon the foregoing Detailed Description, it should be readily apparent that the present invention advantageously provides a scheme for implementing shared protection under a scenario of multiple failures in an optical network. It is believed that the operation and construction of the present invention will be apparent from the foregoing Detailed Description. While the exemplary embodiments of the invention shown and described have been characterized as being preferred, it should be readily understood that various changes and modifications could be made therein without departing from the scope of the present invention as set forth in the following claims.

What is claimed is:

1. A method for providing protection in a communications network including a plurality of nodes coupled by communication links, comprising:
   responsive to a connection request received by an ingress node, computing a working path between said ingress node and an egress node;
   monitoring a quality of the nodes and the communication links;
   detecting a first quality degradation event indicative of a failure prediction of one of the nodes or one of the communications links;
   responsive to detecting the first quality degradation event, monitoring at least one of a temporal or spatial correlation of further possible quality degradation events with respect to the detected first quality degradation event to be able to detect a second quality degradation event indicative of another failure prediction of another one of the nodes or another one of the communication links; and
   responsive to detecting the second quality degradation event, computing a plurality of backup paths between said ingress and egress nodes where the nodes and/or the communication links associated with the first and second quality degradation events are not used in a same backup path.

2. The method for providing protection in a communications network including a plurality of nodes coupled by communication links as set forth in claim 1, wherein said working path between said ingress node and said egress node is computed based on a Shortest Path First (SPF) algorithm.

3. The method for providing protection in a communications network including a plurality of nodes coupled by communication links as set forth in claim 1, wherein said backup paths are computed recursively until a predetermined number of backup paths is reached with respect to said working path.

4. The method for providing protection in a communications network including a plurality of nodes coupled by communication links as set forth in claim 1, wherein said backup paths comprise paths that are completely link-disjointed with respect to one another.

5. The method for providing protection in a communications network including a plurality of nodes coupled by communication links as set forth in claim 1, wherein said backup paths comprise paths that are partially link-disjointed with respect to one another.

6. The method for providing protection in a communications network including a plurality of nodes coupled by communication links as set forth in claim 1, wherein said backup paths comprise paths that are completely node-disjointed with respect to one another.

7. The method for providing protection in a communications network including a plurality of nodes coupled by communication links as set forth in claim 1, wherein said backup paths comprise paths that are partially node-disjointed with respect to one another.

8. The method for providing protection in a communications network including a plurality of nodes coupled by communication links as set forth in claim 1, wherein said backup paths comprise paths that are completely link-disjointed with respect to said working path.

9. The method for providing protection in a communications network including a plurality of nodes coupled by communication links as set forth in claim 1, wherein said backup paths comprise paths that are partially link-disjointed with respect to said working path.

10. The method for providing protection in a communications network including a plurality of nodes coupled by communication links as set forth in claim 1, wherein said backup paths comprise paths that are completely node-disjointed with respect to said working path.

11. The method for providing protection in a communications network including a plurality of nodes coupled by communication links as set forth in claim 1, wherein said backup paths comprise paths that are partially node-disjointed with respect to said working path.

12. The method for providing protection in a communications network including a plurality of nodes coupled by communication links as set forth in claim 1, wherein said working path and said backup paths are computed based on a cost parameter associated with said communication links, said cost parameter operating to penalize communication links that disallow sharing of paths.

13. The method for providing protection in a communications network including a plurality of nodes coupled by communication links as set forth in claim 1, wherein said working path and said backup paths are computed based on a prior-use cost parameter associated with said communication links, said prior-use cost parameter operating to penalize communication links that are already used.

14. A communication network including a plurality of nodes coupled by communication links, comprising:
  a quality monitor that monitors a quality of the nodes and the communication links;
  an ingress node, responsive to a connection request, that computes a working path between itself and an egress node;
  said quality monitor further detects a first quality degradation event indicative of a failure prediction of one of the nodes or one of the communications links;
  said quality monitor, responsive to detecting the first quality degradation event, monitors at least one of a temporal or spatial correlation of further possible quality degradation events with respect to the detected first quality degradation event to be able to detect a second quality degradation event indicative of another failure prediction of another one of the nodes or another one of the communication links; and
  said ingress node, responsive to the detection of the second quality degradation event, computes a plurality of backup paths between said ingress and egress nodes where the nodes and/or the communication links associated with the first and second quality degradation events would not be used in a same backup path.

15. The communication network for providing protection in a communications network including a plurality of nodes coupled by communication links as set forth in claim 14, wherein said working path between said ingress node and said egress node is computed based on a Shortest Path First (SPF) algorithm.

16. The communication network for providing protection in a communications network including a plurality of nodes coupled by communication links as set forth in claim 14, wherein said backup paths are computed recursively until a predetermined number of backup paths is reached with respect to said working path.

17. The communication network for providing protection in a communications network including a plurality of nodes coupled by communication links as set forth in claim 14, wherein said backup paths comprise paths that are completely link-disjointed with respect to one another.

18. The communication network for providing protection in a communications network including a plurality of nodes coupled by communication links as set forth in claim 14, wherein said backup paths comprise paths that are partially link-disjointed with respect to one another.

19. The communication network for providing protection in a communications network including a plurality of nodes coupled by communication links as set forth in claim 14, wherein said backup paths comprise paths that are completely node-disjointed with respect to one another.

20. The communication network for providing protection in a communications network including a plurality of nodes coupled by communication links as set forth in claim 14, wherein said backup paths comprise paths that are partially node-disjointed with respect to one another.

21. The communication network for providing protection in a communications network including a plurality of nodes coupled by communication links as set forth in claim 14, wherein said backup paths comprise paths that are completely link-disjointed with respect to said working path.

22. The communication network for providing protection in a communications network including a plurality of nodes coupled by communication links as set forth in claim 14, wherein said backup paths comprise paths that are partially link-disjointed with respect to said working path.

23. The communication network for providing protection in a communications network including a plurality of nodes coupled by communication links as set forth in claim 14, wherein said backup paths comprise paths that are completely node-disjointed with respect to said working path.

24. The communication network for providing protection in a communications network including a plurality of nodes coupled by communication links as set forth in claim 14, wherein said backup paths comprise paths that are partially node-disjointed with respect to said working path.

25. The communication network for providing protection in a communications network including a plurality of nodes coupled by communication links as set forth in claim 14, wherein said working path and said backup paths are computed based on a cost parameter associated with said communication links, said cost parameter operating to penalize communication links that disallow sharing of paths.

26. The communication network for providing protection in a communications network including a plurality of nodes coupled by communication links as set forth in claim 14, wherein said working path and said backup paths are computed based on a prior-use cost parameter associated with said communication links, said prior-use cost parameter operating to penalize communication links that are already used.

27. A network element disposed as an ingress node in an optical network formed from a plurality of nodes that are inter-coupled via optical communication links, said ingress node including a computer readable medium having a plurality of instructions which when executed by a computer cause said ingress node to perform operations comprising:
   computing a working path between said ingress node and an egress node;
   upon receiving an indication that at least two quality degradation events having at least a temporal or spatial correlation with respect to one another have occurred which are indicative of a failure prediction of one or more of the nodes or one or more of the communications links, computing a plurality of backup paths between said ingress and egress nodes where the nodes and/or the communication links associated with the at least two quality degradation events are not used in a same backup path.

28. The network element as set forth in claim 27, wherein said instructions for computing said working path include instructions for determining a working path between said ingress node and said egress node based on a shortest path first algorithm.

29. The network element as set forth in claim 27, wherein said instructions for computing said backup paths include instructions operable to determine multiple backup paths using a methodology in which said backup paths are completely link-disjointed with respect to one another.

30. The network element as set forth in claim 27, wherein said instructions for computing said backup paths include instructions operable to determine multiple backup paths using a methodology in which said backup paths are completely node-disjointed with respect to one another but for said ingress and egress nodes.

31. The network element as set forth in claim 27, wherein said instructions for computing said backup paths include instructions operable to determine multiple backup paths using a methodology in which said backup paths are partially node-disjointed with respect to one another but for said ingress and egress nodes.

32. The network element as set forth in claim 27, wherein said instructions for computing said backup paths include instructions operable to determine multiple backup paths using a methodology in which said backup paths are partially link-disjointed with respect to one another.

33. The network element as set forth in claim 27, wherein said instructions for computing said backup paths and said working path include instructions operable to calculate paths based on a cost parameter associated with said communication links, said cost parameter operating to penalize communication links that disallow sharing of paths.

34. The network element as set forth in claim 27, wherein said instructions for computing said backup paths and said working path include instructions operable to calculate paths based on a prior-use cost parameter associated with said communication links, said prior-use cost parameter operating to penalize communication links that are already used.

* * * * *